Feb. 19, 1924.

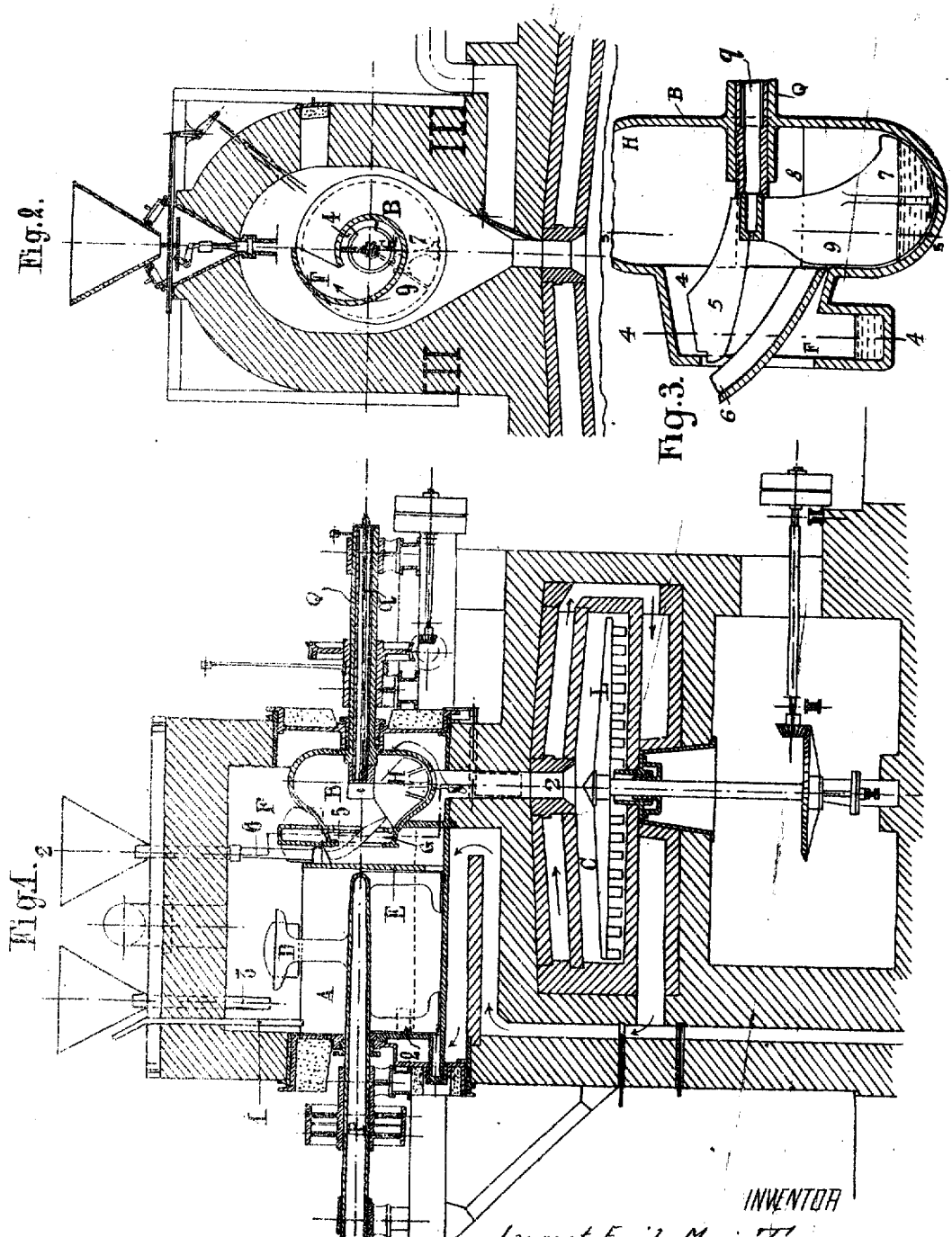

L. E. M. TREVOUX 1,484,587

PROCESS AND APPARATUS FOR THE CONTINUOUS PRODUCTION OF SULPHATES

Filed May 24, 1921   2 Sheets-Sheet 2

INVENTOR
L.E.M. Trevoux,
BY
Emil Bonnelycke
ATTORNEY

Patented Feb. 19, 1924.

1,484,587

UNITED STATES PATENT OFFICE.

LAURENT EMILE MARIE TREVOUX, OF PETIT-QUEVILLY, FRANCE, ASSIGNOR TO LA SOCIETE ANONYME DE PRODUITS CHIMIQUES, ETABLISSEMENTS MALETRA, SIEGE SOCIAL, OF PETIT-QUEVILLY, FRANCE.

PROCESS AND APPARATUS FOR THE CONTINUOUS PRODUCTION OF SULPHATES.

Application filed May 24, 1921. Serial No. 472,231.

*To all whom it may concern:*

Be it known that I, LAURENT EMILE MARIE TREVOUX, citizen of the Republic of France, and resident of Petit-Quevilly, France (post-office address Petit-Quevilly, Seine-Inferieure), have invented a new and useful Process and Apparatus for the Continuous Production of Sulphates, which improvements are fully set forth in the following specification.

The present invention relates to a process and apparatus for the continuous production of sulphates.

The known mechanical processes for the production of anhydrous sulphates, leading to an acid sulphate which is liquid in the warm and to a solid anhydrous sulphate, are only the reproduction of the conditions of hand labour which have existed for a century. These working conditions involve two distinct stages and relate to the handling of large quantities. The linking together of these two stages, liquid treatment and calcining, can be realized as systematically as possible. The consequence of all these types of furnaces is an emission of gas varying within wide limits and a considerable amount of condensation corresponding to these variations in emission.

It is true that a process, that of the Farbwerke vorm. Meister, Lucius and Bruning, of Hochst, is supposed to be continuous, but in reality the only continuous part is the production of acid sodium sulphate $NaHSO_4$, which does not present any difficulty. In reality the second stage comprises complex operations of cooling the acid sulphate, crushing, mixing it with salt and finally introducing it in a continuous furnace which calcines the intimate mixture, and discharges it in a continuous manner at the bottom of the furnace.

The object of the present invention is based on the division of the work into three stages which are all continuous and proceed in uninterrupted succession.

The first stage effects the continuous formation of acid sodium sulphate, the methodic introduction of sulfuric acid and salt in the desired proportions in the interior of an already liquid mass of acid sodium sulphate which serves as a heat carrier and effects the rapid transformation of the mixture of sulfuric acid and sodium chloride into hydrochloric acid and acid sodium sulphate.

A second stage effects the intimate mixture of the acid sodium sulphate and sodium chloride, between a liquid portion drawn from the mixer used in the first stage, and an adequate amount of salt supplied from a continuous distributor. This mixture becomes rapidly transformed into a pasty mass with partial evolution of hydrochloric acid which as soon as formed, is discharged into the mixer used for the third stage.

In the third stage, the mixture of acid sodium sulphate and salt, the original constituents of which have already partly reacted on one another, is completely transformed into sodium sulphate and hydrochloric acid in a mixing and calcining furnace and discharged in a continous manner from the bottom.

These three stages must be carried out at suitable temperatures carefully regulated in view of the reactions to be obtained in each stage. The stages 1 and 2 moreover, necessitate the suitable regulation of the admission of the two initial constituents of each stage.

A way of carrying out the invention has been represented by way of example in the accompanying drawings.

Fig. 1 is a longitudinal section of the furnace.

Fig. 2 is a transverse section on line 2—2, Fig. 1, showing the proportionating mixer in which the second stage of the reaction is effected.

Fig. 3 is a vertical section of said mixer, but showing the mixer in opposite position from Fig. 1.

Figure 4:
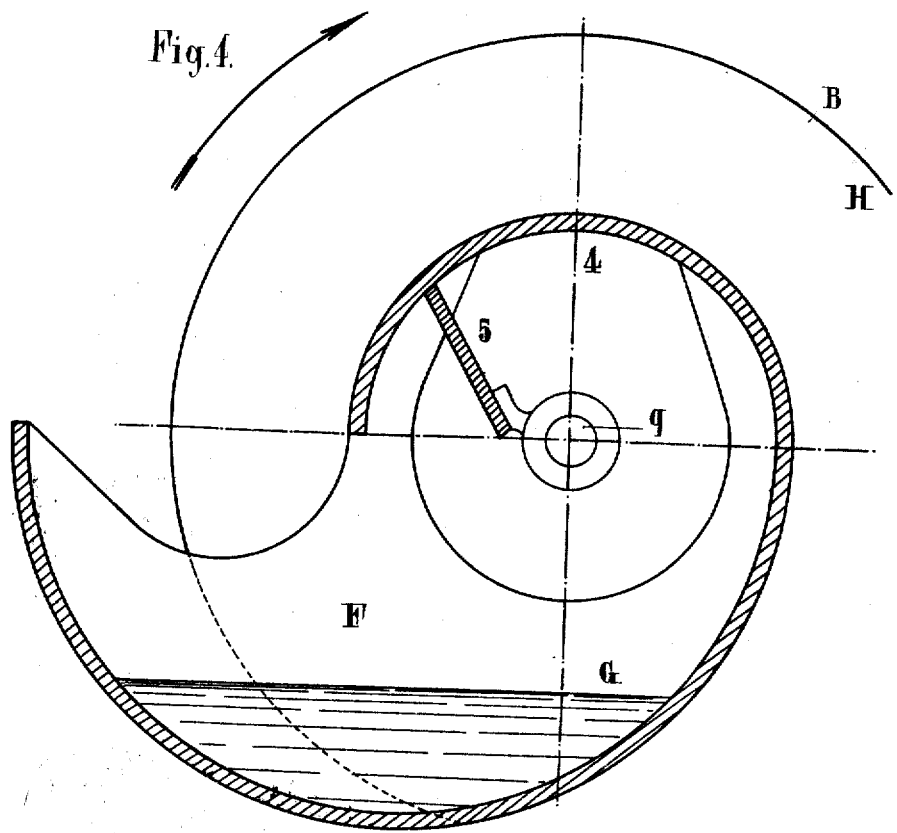
Figure 5:
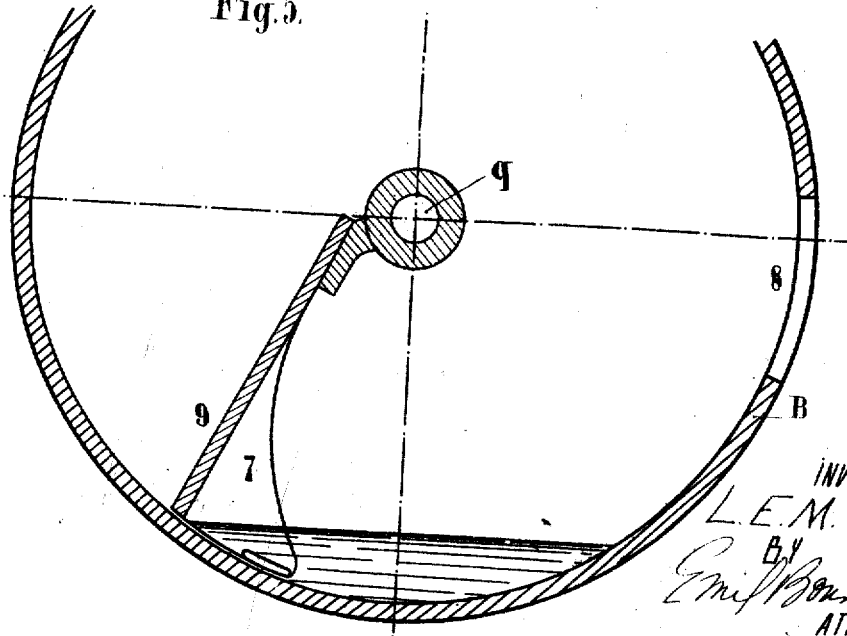

Figs. 4 and 5 are sections on lines 4—4 and 5—5 of Fig. 3.

A is a vessel of cylindrical shape and which is prolonged in the upward direction by plain walls. In this vessel revolves a paddle agitator D which is mounted on the shaft P. Sulfuric acid is introduced in a continuous manner either through the tube 1 situated at the upper end or through the tube 2 situated at the lower end of said vessel. The sea salt is introduced through the tube 3 in an automatic and continuous manner. A partition E transverse to the axis of the vessel but open at the lower part divides the vessel into two unequal chambers and retards the passage of the bisulfate from the large into the smaller chamber, in such a way that the bisulphate which is scooped out by a scoop F at each rotation of its shaft Q shall consist of well formed liquid acid sulphate.

This vessel A is heated to a suitable temperature by means of gases supplied from a furnace or from a producer, which gases have previously heated the calcining furnace C and the mixer B.

At each rotation of shaft Q, the scoop F scoops in the rear chamber of the vessel A a quantity of acid sulphate large enough to fill an annular pan G, which plays the part of a measuring device, the excess liquid falling back into the rear chamber. As the rotation of the shaft continues, the measured volume of liquid falls through the slot 4 in the side wall of the pan G, into the torus-shaped pocket H of the mixer B. A scraper 5 ensures the cleaning of the annular measuring pan G; said scraper being attached to a shaft $q$, as clearly shown in Fig. 3.

At the same time the quantity of sea salt corresponding to the quantity of acid sulphate discharged as above described is admitted through the tube 6, so that the two constituents are in the desired proportions for the third stage of the reaction to yield neutral sulphate. As the rotation of the mixer B continues the reaction between the two constituents proceeds, being aided by the mixing paddles 7, which describe a swinging movement, until the mixture reaches the opening 8 in the periphery of the pocket H, and falls into the axis of the calcining pan C. A scraper 9, also provided on the shaft $q$ and preferably connected with the first scraper 5, prevents the mixture from remaining in the pocket H, and the paddles 7 may form integral parts of the scraper 9.

The scoop F and the pocket H of the mixer B are preferably integrally or otherwise rigidly connected together (Fig. 3) and are mounted on shaft Q, which latter is made hollow to permit the scraper shaft $q$ to extend through it.

There may be any desired number of paddles and scrapers, and they may either rotate or swing in order to properly effect their purpose. In the event of their rotating, the hollow shaft Q which carries the parts B and F must turn at a much slower speed than the shaft $q$ which carries the paddles and scrapers.

The mixture falling from the mixer B into the calcining pan C is taken by the rabbles L and is slowly conveyed from the centre to the periphery along a spiral path, by the usual means, in such a way that the mixture progressively attains the desired temperature so that the reaction is complete and the hydrochloric acid is completely liberated, and so that the sulphate arrives, in a properly calcined state, at the point M where it is discharged also in a systematic and continuous manner.

The hydrochloric acid gases are discharged and collected either separately as regards the portions disengaged in A, B and C respectively, or in common.

What I claim and desire to secure by Letters Patent is:—

1. The process for the continuous production of sulphates from chlorides and sulfuric acid, which comprises methodically introducing the desired amounts of sulfuric acid and chloride within an already liquid mass of acid sulphate serving as a heat carrier, and assisting in the rapid transformation of the chloride into acid sulphate, thereupon adding an adequate amount of chloride to a liquid portion of said acid sulphate formed and intimately mixing to transform the mixture into a pasty mass and finally transforming said pasty mass into neutral sulphate by calcining said pasty mass whilst constantly stirring.

2. The process for the continuous production of sodium sulphate from sea salt and sulfuric acid, which comprises methodically introducing the desired amounts of sulfuric acid and sea salt within an already liquid mass of acid sodium sulphate serving as a heat carrier, and assisting in the rapid transformation of the sea salt into acid sodium sulphate, thereupon adding an adequate amount of sea salt to a liquid portion of said acid sodium sulphate formed and intimately mixing to transform the mixture into a pasty mass and finally transforming said pasty mass into neutral sodium sulphate by calcining said pasty mass whilst constantly stirring.

3. The process for the continuous production of sulphates, which consists in effecting in a single apparatus and in three stages the transformation of chloride and sulfuric acid into sulphate; a first stage effecting in a continuous manner the formation of the acid sulphate by the systematic addition of sulfuric acid and of said chloride in the desired proportions and their action within an already liquid mass of acid sulphate, said mass serving as heat carrier and assisting in the rapid formation of the acid sulphate; a second stage effecting the intimate mixing of the already formed acid sulphate and of chloride, by taking a liquid portion from the mixer of the first stage, and adding an adequate amount of chloride from a continuous distributor, said mixture becoming transformed rapidly into a pasty mass; and a third stage in which the mixture of acid sulphate and chloride of the second stage, discharged as soon as formed, is completely transformed into neutral sulphate, with the formation of hydrochloric acid, in a calcining pan which acts at the same time as a mixer.

4. The process for the continuous production of sodium sulphate, which consists in effecting in a single apparatus and in three stages the transformation of sea salt and sulfuric acid into sulphate; a first stage effecting in a continuous manner the formation of the acid sodium sulphate by the systematic addition of sulphuric acid and of the sea salt in the desired proportions and their action within an already liquid mass of acid sulphate, said mass serving as heat carrier and assisting in the rapid formation of the acid sodium sulphate; a second stage effecting the intimate mixing of the already formed acid sodium sulphate and of sea salt, by taking a liquid portion from the mixer of the first stage, and adding an adequate amount of sea salt from a continuous distributor, said mixture becoming transformed rapidly into a pasty mass; and a third stage in which the mixture of acid sodium sulphate and chloride of the second stage, discharged as soon as formed is completely transformed into neutral sodium sulphate, with the formation of hydrochloric acid, in a calcining pan which acts at the same time as a mixer.

5. A single apparatus for effecting the continuous production of sulphates from chlorides and sulfuric acid, comprising a vessel adapted to be heated; means for supplying salt and liquid acid to the heated vessel; means for mixing the salt and acid in said vessel; a second vessel; mixing means therein; means for removing measured quantities of the mixture from the first vessel and depositing them in the second vessel; means for supplying measured quantities of salt to the contents of the second vessel to be mixed therewith, said second vessel having means for discharging the mixture obtained therein; and means for heating and stirring the last named mixture and for continuously effecting its conveyance and final discharge.

6. A single apparatus for effecting the continuous production of sulphates from chlorides and sulfuric acid, comprising a vessel adapted to be heated; a transverse vertical partition in said vessel dividing the interior thereof into two compartments and having an opening at its bottom to provide communication between the compartments; means for supplying salt and liquid acid to one compartment; mixing means in said compartment; a rotatable vessel exterior to the other compartment having a scoop connected to it for removing measured quantities of the mixture from that compartment and discharging them into the rotatable vessel; mixing means in said rotatable vessel; means for supplying measured quantities of salt to the rotatable vessel for admixture with the contents thereof, said rotatable vessel having means for discharging the mixture obtained therein; and means for heating and stirring the last named mixture and for continuously effecting its conveyance and final discharge.

7. In an apparatus for producing sulphates from chlorides and sulfuric acid, the combination of a rotatable mixing vessel having a scoop connected to it to pick up measured quantities of liquid and discharge them into the interior of the vessel; and mixing means within said vessel for acting on the liquid thereon.

8. In an apparatus for producing sulphates from chlorides and sulfuric acid, the combination of a rotatable mixing vessel having connected to one side thereof a scoop to pick up measured quantities of liquid and discharge them into the interior of the vessel, said vessel also having an outlet for the liquid which is located at a point remote from the mouth of the scoop; and mixing means within said vessel for acting on the liquid therein.

9. In an apparatus for producing sulphates from chlorides and sulfuric acid, the combination of a rotatable mixing vessel having a scoop connected to it to pick up measured quantities of liquid and discharge them into the interior of the vessel; a hollow shaft on which said vessel is mounted to rotate with the shaft; a shaft disposed within the first shaft and projecting into the interior of the vessel; and mixing means within said vessel secured to the projecting end of the second shaft.

In testimony whereof I have signed this specification in the presence of two subscribing witnesses.

TREVOUX, LAURENT EMILE MARIE.

Witnesses:
FERNAND DUFOUR,
CHARLES LEON LOISEL.